Figure 1:
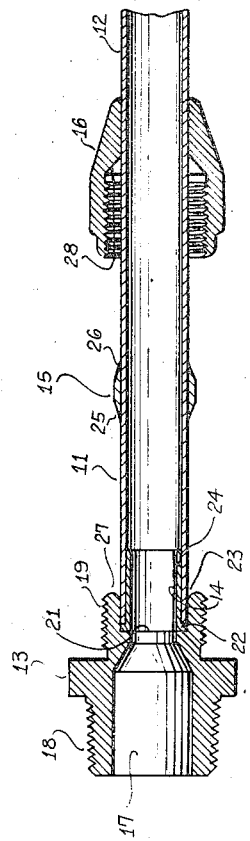

Feb. 1, 1949.                A. FRIEDMAN                2,460,741
                            RANGE CONNECTOR
                          Filed Jan. 9, 1946

INVENTOR.
Arthur Friedman
BY
Frederic B. Schramm
Attorney

Patented Feb. 1, 1949

2,460,741

UNITED STATES PATENT OFFICE 2,460,741

RANGE CONNECTOR

Arthur Friedman, Shaker Heights, Ohio, assignor to Patrol Valve Company, Cleveland, Ohio, a corporation of Ohio Application January 9, 1946, Serial No. 639,931

5 Claims. (Cl. 285—122)

My invention relates to tube couplings and concerns particularly fittings and connectors for flexible tubing.

It is an object of my invention to provide an improved coupling which may be employed for making connections quickly with tubing, especially flexible tubing such as aluminum or copper tubing, for example.

A further object of my invention is to make connections quickly with tubing without any necessity for flaring the tube end.

A further object of the invention is to make gas connections quickly with gas ranges, water heaters, and other apparatus and to connect gas ranges or the like in such a manner that after the gas connections have been made, the range may be moved about for cleaning or other purposes, laying of flooring, slight changes of permanent position, etc.

Still another object of the invention is to support firmly the inner and outer side walls of tubing to be connected.

A further object is to avoid pipe cutting, threading, waste and breakage in making connections to gas ranges.

Still another object of the invention is to make connections to gas lines without any requirement for special tools.

Other and further objects, features and advantages of the invention will become apparent as the description proceeds.

A better understanding of the invention will be afforded by the following detailed description considered in conjunction with the accompanying drawing, the single figure of which is a longitudinal medial sectional view of a tube coupling or connector showing two of the parts disengaged for exposing the interior of the construction.

The drawing illustrates a method of quickly making a connection to the end 11 of a tube 12 which may be a length of flexible tubing such as aluminum or copper tubing, for example. For making a connection with such tubing, I provide in conjunction with the tubing 12 a body 13, an inner sleeve 14, a tightening ring 15, and a clamping nut 16.

The body 13 is provided with a bore 17 adapted to form a continuation of the bore of the tubing 12. The body 13 may be connected to or form a part of apparatus having a passageway to which the tubing 12 is to be connected. For example, as illustrated, the body 13 may have a pipe thread 18 adapted to be threaded into the end of a rigid gas pipe or into the manifold or gas line of a movable device, such as a gas range for example, receiving a gas supply from flexible tubing 12 in order that the range may be moved about for laying linoleum, for cleaning purposes, or for making slight changes in the permanent position without opening the gas line. The body 13 is provided with a nipple 19 threaded to receive the tube nut 16, and having a counter bore 21 adapted to receive the inner sleeve 14 and the tube end 11.

The inner sleeve 14 is formed with a flange 22 fitting the internal cylindrical surface of the counter bore 21 so as to leave an annular groove 23 corresponding in thickness to the thickness of the tubing 12. Preferably the inner sleeve 14 is of greater length than the counter bored portion 21 of the body 13 so that the inner sleeve 14 has a part 24, which provides inner support for a substantial portion of the tube 12 beyond the end of the nipple 19.

The ring 15 is provided with outer tapering end surfaces 25 and 26, and preferably the inner edge 27 of the end of the nipple 19 is rounded to provide an entering space for the tapering end 25 of the ring 15. The ring 15 has an internal diameter of such size as to slip easily along the outer surface of the tubing 12.

The tube nut 16 preferably has an inner tapering shoulder 28 corresponding to the tapering end 26 of the ring 15 where the outer end 26 of the ring 15 is tapered, but the invention is not limited to providing the tapering surfaces 26 and 28 on the parts 15 and 16, respectively. The tube nut, also, preferably has such an internal diameter as to slip easily along the tubing 12. It will be understood that the ring 15 and the nut 16 have been shown away from their normal connecting position in order to illustrate more clearly the construction and arrangement of the body 13, and the inner sleeve 14, and the manner in which the tube end 11 is received in the annular groove 23 formed between the inner sleeve 14 and the inner surface of the counter bore 21.

When the tube 12 is to be connected to the body 13, preferably the tube nut 16 and the ring 15 are first slipped over the tube end 11 to about the positions shown in the drawing and the inner sleeve 14 is then inserted into the end of the tube with the flange 22 resting against the end of the tubing. The tube end 11, thus reinforced, is then inserted into the counter bore 21 and the ring 15 is slid forward along the tubing simultaneously with sliding the tube nut 16 forward to cause the tapering end 25 of the ring 15 to enter a space between the outer surface of the tube 12 and the blunted edge 27 of the nipple 19. The tube nut 16 is threaded on the nipple 19 in order to drive the tapering forward end or blade 25 of the ring 15 between the outer surface of the tubing 12 and the inner surface of the outer end of the counter bore 21 so as to grip the tube end 11 tightly between the outer surface of the inner sleeve 14 and the ring 15, which is, in turn, held tightly against the nipple 19 by the nut 16. Inasmuch as the inner sleeve 14 extends for some distance into the tube 12, it will be observed that the portion of the tube 12 around which the ring 15 fits is supported at the inner surface by the inner sleeve 14 and at the outer surface by the ring 15. An additional length of the tubing 12 is supported by the tube nut 16 so that tendency for breakage of the tubing 12 or for any loosening of the joint between the tube 12 and the body 13 is avoided.

The body 13 and the tube nut 16 are composed of a suitable material such as steel, brass or the like. Preferably, the inner sleeve 14 and the ring 15 are composed of a relatively hard material such as brass, stainless steel, or the like. In this manner a leak-proof, gas-tight joint is quickly and easily produced without any necessity for special tools, or for pipe-threading, without any danger of breakage and without requiring the use of cement or filling compounds.

It will be observed that all parts of the coupling are relatively simple and easily machined or otherwise produced on automatic apparatus. Thus they may be produced inexpensively and accurately.

When flexible tubing, such as the tubing 12, is to be employed for making a connection between the end of a rigidly installed gas pipe, and a slightly movable device, such as a gas range for example, fittings such as the body 13 are provided at the end of the stationary gas pipe and in the range. The two ends of a length of tubing 12 are then inserted in the two fittings in the manner already described. Within the time required for inserting the tubing and drawing up the tube nuts, such as the tube nut 16, the range connection is completed.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What is claimed is:

1. A fitting adapted to receive a tube and comprising in combination a body having a counterbore therein, a sleeve adapted to fit within the tube and with a flange adapted to fit in and against the bottom of said counterbore to form an annular space to receive the end of the tube between said sleeve and the inner surface of said counterbore, a tapered ring having a tapering edge adapted to fit in said counterbore, and a tube nut for drawing said ring against said counterbore for forcing the tapering edge of said ring inward toward said sleeve.

2. A tube coupling comprising in combination a body with a counterbore therein, a sleeve adapted to fit within the tube and with a flange fitting in and against the bottom of said counterbore to form an annular space for receiving the end of a tube, and means for gripping the outer surface of said tube end and holding it against the sleeve.

3. A tube coupling comprising a body having a bore therein, the body being counterbored at one end of the bore to receive a tube; a sleeve dimensioned to fit within the tube and formed with a flange adapted for engagement between the end of the tube and the bottom of the counterbore, the diameter of the flange approximating that of the counterbore so that the flange aligns the sleeve centrally of the counterbore; a nut threadedly engageable with the body and adapted to fit over the tube, and a ring on the tube between the body and nut, the ring being formed with a chamfer defining a sharp edge adapted to enter between the body and tube, compress the tube against the sleeve, and force the tube and sleeve to the bottom of the counterbore, as the nut is tightened on the body.

4. A tube coupling comprising in combination a body formd with a bore therein and a shoulder within the bore, the bore being dimensioned to receive the end of a tube, a sleeve adapted to enter the end of the tube and formed with a flange adapted to be impinged between the end of the tube and the said shoulder, the outer diameter of the flange being approximately the diameter of the bore so that the body and sleeve define an annular space to receive the end of the tube, and means for gripping the outer surface of said tube and forcing it against the sleeve.

5. A tube coupling comprising a body having a bore therein dimensioned to receive the end of a tube and with a shoulder within the bore; a sleeve dimensioned to fit within the tube and formed with a flange adapted for engagement between the end of the tube and the shoulder, the diameter of the flange approximating that of the bore so that the flange aligns the sleeve centrally of the bore; and means adapted to engage the tube, compress the tube against the sleeve, and force the tube longitudinally to impinge the flange between the end of the tube and the shoulder.

ARTHUR FRIEDMAN.

REFERENCES CITED

The following references are of record in the file of this patent:

UNITED STATES PATENTS

| Number | Name | Date |
|---|---|---|
| 1,743,922 | Kirlin | Jan. 14, 1930 |
| 1,875,885 | Quarnstrom | Sept. 6, 1932 |
| 1,896,371 | Quarnstrom | Feb. 7, 1933 |
| 2,152,975 | Sanford | Apr. 4, 1939 |
| 2,188,006 | Katcher | Jan. 23, 1940 |